US008965600B2

(12) United States Patent
Kolbe et al.

(10) Patent No.: US 8,965,600 B2
(45) Date of Patent: Feb. 24, 2015

(54) METHOD FOR DISPLAYING A FLIGHT PLAN

(75) Inventors: Dashiell Matthews Kolbe, Grand Rapids, MI (US); Philip Dewing Sugimoto, Rockford, MI (US); Peter Jacob Conrardy, Tampa, FL (US)

(73) Assignee: GE Aviation Systems, LLC, Grand Rapids, MI (US)

( * ) Notice: Subject to any disclaimer, the term of this patent is extended or adjusted under 35 U.S.C. 154(b) by 274 days.

(21) Appl. No.: 13/558,594

(22) Filed: Jul. 26, 2012

(65) Prior Publication Data

US 2014/0032105 A1 Jan. 30, 2014

(51) Int. Cl.
*G06F 3/048* (2013.01)

(52) U.S. Cl.
USPC .............................................................. 701/3

(58) Field of Classification Search
None
See application file for complete search history.

(56) References Cited

U.S. PATENT DOCUMENTS

| | | | | |
|---|---|---|---|---|
| 6,097,996 | A | 8/2000 | Deker | |
| 6,161,063 | A | 12/2000 | Deker | |
| 6,633,810 | B1 * | 10/2003 | Qureshi et al. | 701/467 |
| 6,643,580 | B1 | 11/2003 | Naimer et al. | |
| 6,922,631 | B1 * | 7/2005 | Dwyer et al. | 701/528 |
| 7,904,238 | B2 | 3/2011 | Nesbitt | |
| 8,073,578 | B1 | 12/2011 | McCusker | |
| 8,380,366 | B1 * | 2/2013 | Schulte et al. | 701/3 |
| 8,630,754 | B2 * | 1/2014 | Coulmeau et al. | 701/15 |
| 8,694,184 | B1 * | 4/2014 | Boorman et al. | 701/14 |
| 2002/0183922 | A1 | 12/2002 | Tomasi et al. | |
| 2004/0204846 | A1 * | 10/2004 | Yano et al. | 701/210 |
| 2006/0025899 | A1 * | 2/2006 | Peckham et al. | 701/3 |
| 2008/0262664 | A1 | 10/2008 | Schnell et al. | |
| 2009/0319100 | A1 * | 12/2009 | Kale et al. | 701/4 |
| 2010/0030401 | A1 * | 2/2010 | Rogers et al. | 701/3 |
| 2010/0131126 | A1 * | 5/2010 | He et al. | 701/14 |
| 2011/0035143 | A1 * | 2/2011 | Lee | 701/200 |
| 2012/0010765 | A1 * | 1/2012 | Wilson et al. | 701/3 |
| 2013/0013133 | A1 * | 1/2013 | Walter | 701/11 |
| 2013/0345905 | A1 * | 12/2013 | Parthasarathy | 701/3 |

FOREIGN PATENT DOCUMENTS

| | | | |
|---|---|---|---|
| EP | 2031350 | A1 | 3/2009 |
| EP | 2136276 | A2 | 12/2009 |
| EP | 2362183 | A2 | 8/2011 |

OTHER PUBLICATIONS

Search Report and Written Opinion from PCT/2013/046493 dated Oct. 21, 2013.
Combine Multiple Streets & Trips Itineraries into a Single File; Laptop GPS World.com; Apr. 27, 2012; www.laptopgpsworld.com/980-combine-multiple-streets-trips-itineraries-into-single-file; 2 pages.

(Continued)

*Primary Examiner* — John R Olszewski
*Assistant Examiner* — Navid Ziaeianmehdizadeh
(74) *Attorney, Agent, or Firm* — General Electric Company; William Scott Andes

(57) ABSTRACT

A method for displaying a flight plan having at least one waypoint on a flight display of a flight deck of an aircraft having known flight constraints, including receiving a user input for a user-inputted waypoint and generating an alternative waypoint when the user-inputted waypoint is not suitable and displaying same.

17 Claims, 6 Drawing Sheets

(56) References Cited

OTHER PUBLICATIONS

Flight Guide IEFB User Guide 4.1; date prior to Jul. 26, 2012; 9 pages.

Flight Guide Updates iEFB APP to v4.0; Aero-News Network; Aug. 22, 2011; www.aero-news.net; 2 pages.

* cited by examiner

METHOD FOR DISPLAYING A FLIGHT PLAN

BACKGROUND OF THE INVENTION

Contemporary aircraft may include a flight management system (FMS). The FMS automates a wide variety of in-flight tasks and one of its primary functions is in-flight management of the flight plan. The flight plan may be modeled as a trajectory that can be comprised of a plurality of waypoints. The FMS may be capable of receiving input from a pilot regarding such waypoints but the pilot receives no information related to whether the waypoint added is viable.

BRIEF DESCRIPTION OF THE INVENTION

In one embodiment, the invention relates to a method of displaying a flight plan including receiving a user input for a user-inputted waypoint, determining whether the user-inputted waypoint is suitable based on the flight constraints, generating an alternative waypoint when the user-inputted waypoint is not suitable, and displaying both the user-inputted waypoint and the alternative waypoint.

DESCRIPTION OF EMBODIMENTS OF THE INVENTION

Figure 1:
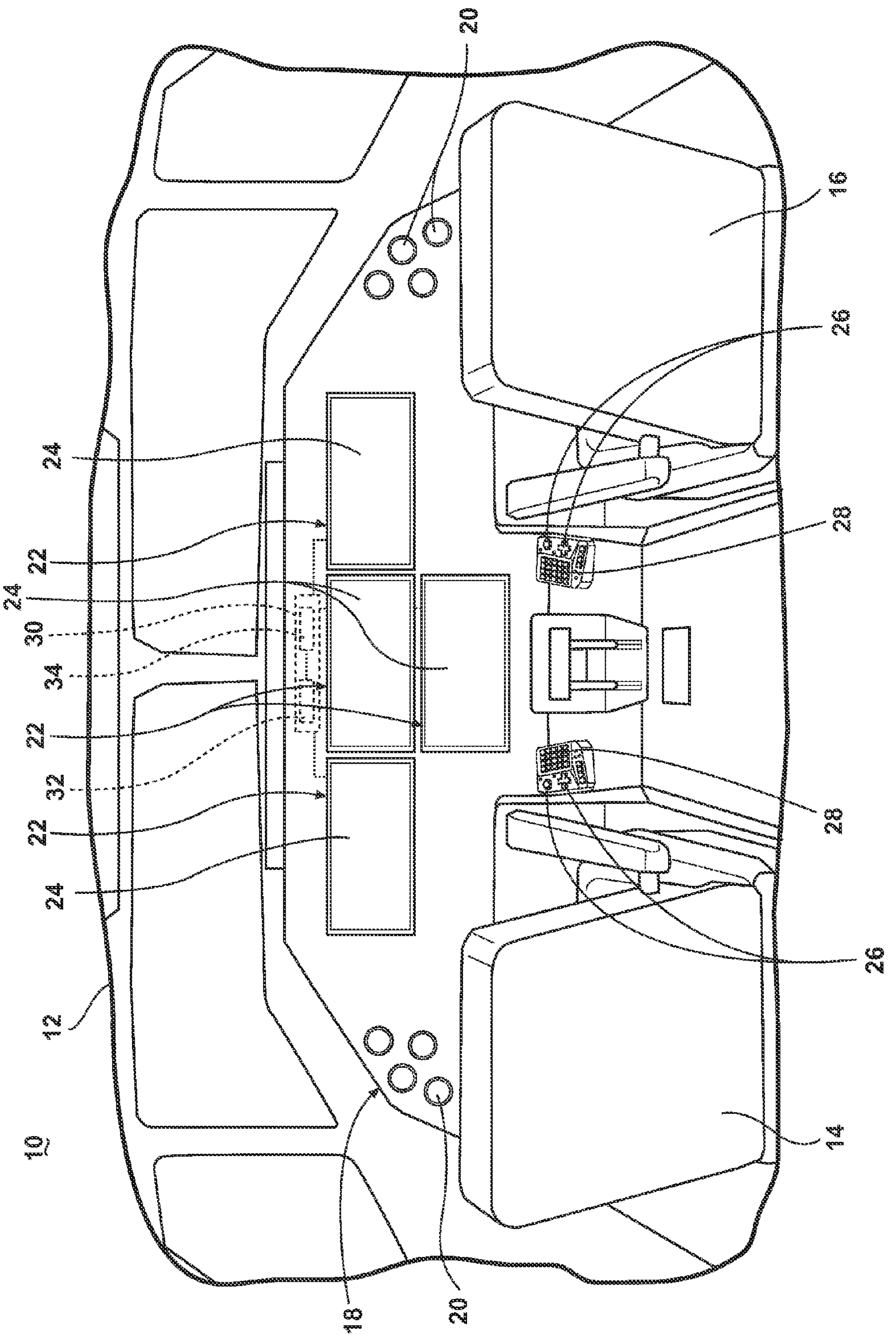
FIG. 1 is a perspective view of a portion of an aircraft cockpit with a flight display on which at least a portion of a flight plan may be displayed according to embodiments of the invention.

FIG. 1 illustrates a portion of an aircraft 10 having a cockpit 12. While a commercial aircraft has been illustrated, it is contemplated that embodiments of the invention may be used in any type of aircraft allowing for a flight plan to be selected and displayed. A first user (e.g., a pilot) may be present in a seat 14 at the left side of the cockpit 12 and another user (e.g., a co-pilot) may be present at the right side of the cockpit 12 in a seat 16. A cockpit instrument panel or flight deck 18 having various instruments 20 and multiple multifunction flight displays 22 may be located in front of the pilot and co-pilot and may provide the flight crew with information to aid in flying the aircraft 10.

The flight displays 22 may include either primary flight displays or multi-function displays and may display a wide range of aircraft, flight, navigation, and other information used in the operation and control of the aircraft 10. The flight displays 22 may be capable of displaying color graphics and text to a user. The flight displays 22 may be laid out in any manner including having fewer or more displays and need not be coplanar or the same size. A touch screen display or touch screen surface 24 may be included in the flight display 22 and may be used by one or more flight crew members, including the pilot and co-pilot, to interact with the systems of the aircraft 10. It is contemplated that one or more cursor control devices 26, such as a mouse, and one or more multifunction keyboards 28 may be included in the cockpit 12 and may also be used by one or more flight crew members to interact with the systems of the aircraft 10.

A controller 30 may be operably coupled to components of the aircraft 10 including the flight displays 22, touch screen surface 24, cursor control devices 26, and keyboards 28. The controller 30 may also be connected with other controllers (not shown) of the aircraft 10. The controller 30 may include memory, the memory may include random access memory (RAM), read-only memory (ROM), flash memory, or one or more different types of portable electronic memory, such as discs, DVDs, CD-ROMs, etc., or any suitable combination of these types of memory. The controller 30 may include processing units, which may be running any suitable programs to implement a graphical user interface (GUI) and operating system. These programs typically include a device driver that allows the user to perform functions on the touch screen surface 24 such as selecting options, inputting commands and other data, selecting and opening files, and moving icons through the touch screen surface 24. The controller 30 may be a portion of an FMS or may be operably coupled to the FMS.

The controller 30 may include a processor 32 and memory 34. A computer searchable database of information may be stored in the memory 34 and accessible by processor 32. The processor 32 may run a set of executable instructions to display the database or access the database. Alternatively, the controller 30 may be operably coupled to a database of information. For example, such a database may be stored on an alternative computer or controller. It will be understood that the database may be any suitable database, including a single database having multiple sets of data, multiple discrete databases linked together, or even a simple table of data.

The database may store imagery data that may include geo-specific terrain, man-made objects including runway and airport layouts, and additional imagery including aircraft traffic information. It is contemplated that the database may incorporate a number of databases or that the database may actually be a number of separate databases including a terrain data base, man-made obstacle database, geo-political database, hydrological database, and other databases. It is contemplated that the controller 30 retrieves and displays an image on the display by generating an image from the information and imagery data obtained from the multiple databases. The database may also include runway data, aircraft performance data, engine performance data, current weather conditions, and historical performance data. This data may be stored as performance attributes of the aircraft, geographic constraints, and weather constraints.

Alternatively, it is contemplated that the database may be separate from the controller but may be in communication with the controller 30 such that it may be accessed by either the controller 30. For example, it is contemplated that the database may be contained on a portable memory device and in such a case, the flight deck 18 may include a port for receiving the portable memory device and such a port would be in electronic communication with controller 30 such that controller 30 may be able to read the contents of the portable memory device. It is also contemplated that the database may be updated through a communication link and that in this manner real time information such as information regarding air traffic imagery may be included in the database and may be included in image displayed by the controller 30.

Further, it is contemplated that such a database may be located off the aircraft 10 at a location such as airline or flight operations department control (not shown) or another location and that the controller 30 may be operably coupled to a wireless network (not shown) over which the database information may be provided to the controller 30. For example, the weather data may be obtained from a weather database which may contain real-time weather data or forecasted weather data. Such weather databases may contain information regarding certain weather-related phenomena (e.g., wind speed, wind direction, temperature, among others) and data pertaining to visibility (e.g., foggy, cloudy, etc.), precipitation (rain, hail, snow, freezing rain, etc.) and other meteorological information. Because air temperature, wind direction, and wind speed must be accounted for in trajectory calculations to ensure that the aircraft can accurately conform to the desired trajectory, the weather database may include 3-D real-time temperature and wind models of the local airspace as well as 4-D forecasted data. The weather database may store such real-time or forecasted weather data based at a specific latitude, longitude, and altitude.

Figure 2:
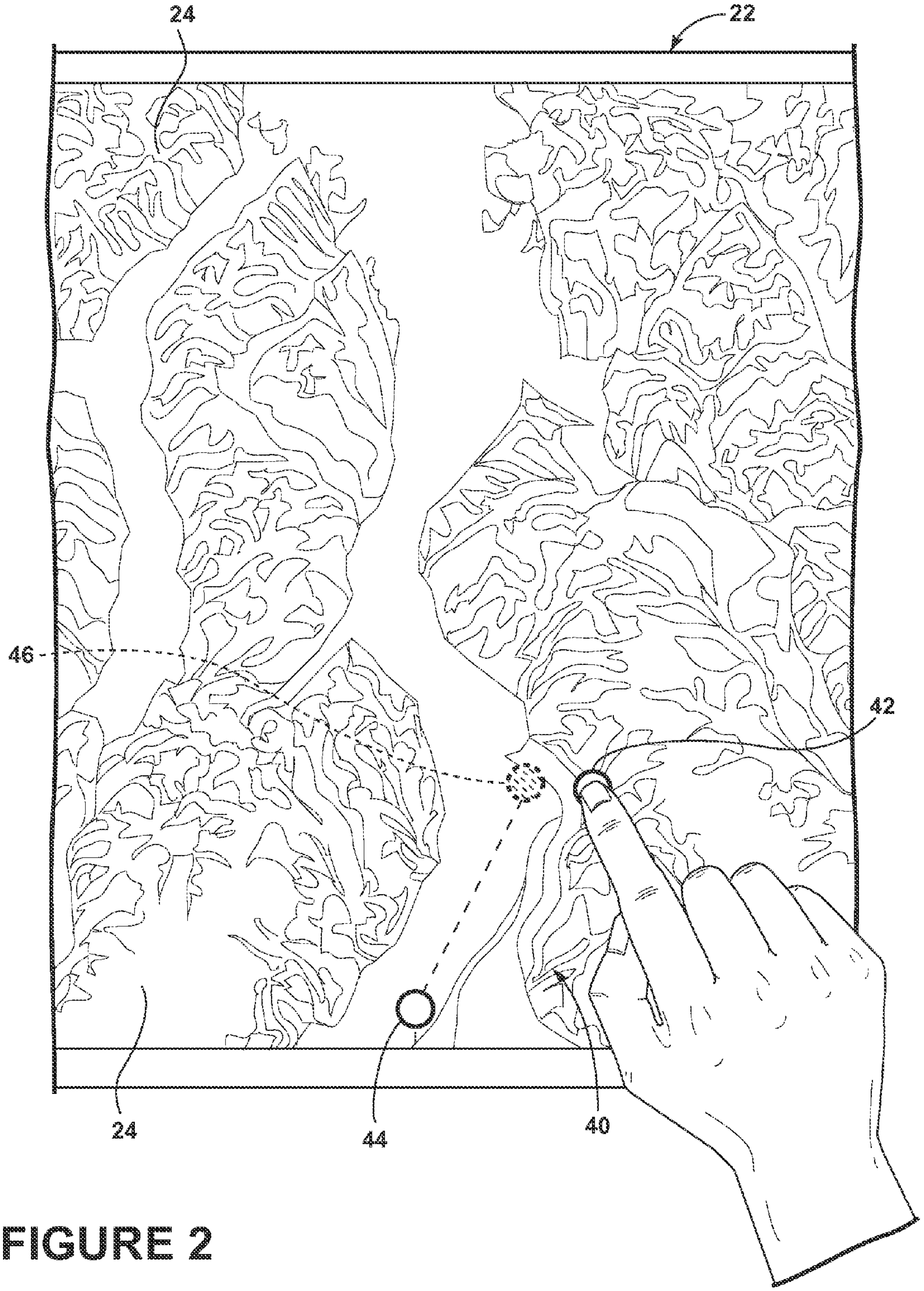
FIG. 2 is a schematic view of a user-inputted waypoint and an alternative waypoint being displayed according to a first embodiment of the invention.

During operation, the aircraft 10 may receive a user input for a user-inputted waypoint, determine whether the user-inputted waypoint is suitable based on flight constraints of the aircraft 10, generate an alternative waypoint when the user-inputted waypoint is not suitable and display both the user-inputted waypoint and the alternative waypoint. By way of non-limiting example, the controller 30 may utilize inputs from the pilot, the database, and/or information from airline control or flight operations department to present a graphical depiction of the surrounding of the aircraft 10 or a future surrounding of the aircraft 10. For example, as illustrated in FIG. 2, a map 40 may be displayed on the flight display 22. The map 40 may illustrate a visual representation of the terrain underlying the flight plan of the aircraft 10. It will be understood that the map 40 may be graphically illustrated in a variety of ways and that various objects, such as the runway, may be illustrated on the flight display 22 to better aid the pilot in making decisions. Further, the map 40 may take any variety of forms including a 2D map, a 3D map, a topographical map, etc.

Portions of the flight plan including a waypoint may be displayed on the map 40. According to an embodiment of the invention, it is contemplated that a user may select a waypoint, such as the illustrated user-inputted waypoint 42 and that such selection may be received by the controller 30. It is contemplated that the user may input the user-inputted waypoint 42 by touching the location on the touchscreen 24 forming the flight display 22, by selecting the location using the cursor control devices 26, or by using the multifunction keyboards 28. For example, when the multifunction keyboard 28 is used to input the user-inputted waypoint 42 a latitude, longitude, and elevation may be received from the user. Regardless of the manner of selection, when the user-inputted waypoint 42 is chosen such information may be received by the controller 30 and in this manner a user input for a user-inputted waypoint may be received. The controller 30 may then display such user-inputted waypoint 42 on the flight display 22.

The controller 30 may then determine whether the user-inputted waypoint 42 is suitable based on flight constraints of the aircraft 10. For example, the suitability of the user-inputted waypoint 42 may be determined by the controller 30 based on constraints such as at least one of weather, terrain, fixed obstacles, and variable obstacles, and flight characteristics or performance attributes of the aircraft 10. Embodiments of the invention may use a database of terrain, weather, and additional information to evaluate suitable locations for the user-inputted waypoint 42. As yet another example, a pilot's or airline's constraints may also be considered by the controller 30 in determining the suitability of locations for the user-inputted waypoint 42. For example, a pilot's flight preferences may be one type of constraint. If the pilot prefers not to fly within a certain range of a mountain, then the controller 30 may utilize such information in determining the suitability of locations for the user-inputted waypoint 42. As yet another example, the controller 30 may determine the suitability of the user-inputted waypoint 42 based on at least one prior waypoint 44 in the flight plan, even if such prior waypoint 44 is not illustrated on the flight display 22. The prior waypoint 44 may be a user or pilot selected waypoint, a waypoint uploaded from the FMS or airline operations center, the prior waypoint 44 may also include a current location of the aircraft 10. More specifically, the information related to both the user-inputted waypoint 42 and the prior waypoint 44 may be utilized by the controller 30 to determine the suitability of the user-inputted waypoint 42. The prior waypoint 44 information may give additional information to the controller 30 to consider related to the heading of the aircraft 10 with respect to the user-inputted waypoint 42. More specifically, the controller 30 uses such information in determining the suitability of locations for the user-inputted waypoint 42.

Taking into account any amount of the information above, the controller 30 may determine a suitability of the user-inputted waypoint 42 by determining if flight constraints would be exceeded if the aircraft 10 traveled the flight plan including the user-inputted waypoint 42. If the flight constraints would be exceeded for a particular location, then the controller may determine that the user-inputted waypoint 42 is not suitable. When the user-inputted waypoint 42 is determined to be not suitable, the controller 30 may then generate an alternative waypoint, such as the illustrated alternative waypoint 46.

In implementation, the one or more constraints may be converted to an algorithm, which may be converted to a computer program comprising a set of executable instructions, which may be executed by the controller 30, which has access to the waypoints entered into the FMS. In this way, one or more particular waypoints may be compared to the constraints and a determination may be made if the waypoint satisfies the constraints. If so, the waypoint may be considered suitable.

By way of example, the controller 30 may generate the alternative waypoint 46 by determining an alternative waypoint 46 based on at least one of weather, terrain, fixed obstacles, variable obstacles, and flight characteristics or performance attributes of the aircraft 10. Further, the controller 30 may look at other portions of the flight plan and the pilot's or airlines' constraints in determining an alternative waypoint 46. Both the user-inputted waypoint 42 and the alternative waypoint 46 may be displayed on the flight display 22. While only a single alternative waypoint 46 has been illustrated it will be understood that multiple alternative waypoints may be determined and displayed. In this manner, when a user-inputted waypoint 42 is determined to be not suitable the user may be provided with a variety of alternatives.

As illustrated, the alternative waypoint 46 may be displayed in a visually distinguishable manner from the user-inputted waypoint 42. Displaying the alternative waypoint 46 in a distinguishable manner may be done in any suitable manner. For example, displaying the alternative waypoint 46 in a distinguishable manner may include displaying the alternative waypoint 46 with at least one of a different color and a different opacity from the user-inputted waypoint 42. More specifically, the alternative waypoint 46 may be a ghosted or semi-transparent waypoint when compared to the user-inputted waypoint 42. Many graphical and illustrative techniques may be used to draw the user's attention to the alternative waypoint 46 and distinguish the alternative waypoint 46 from the user-inputted waypoint 42.

Figure 3A:
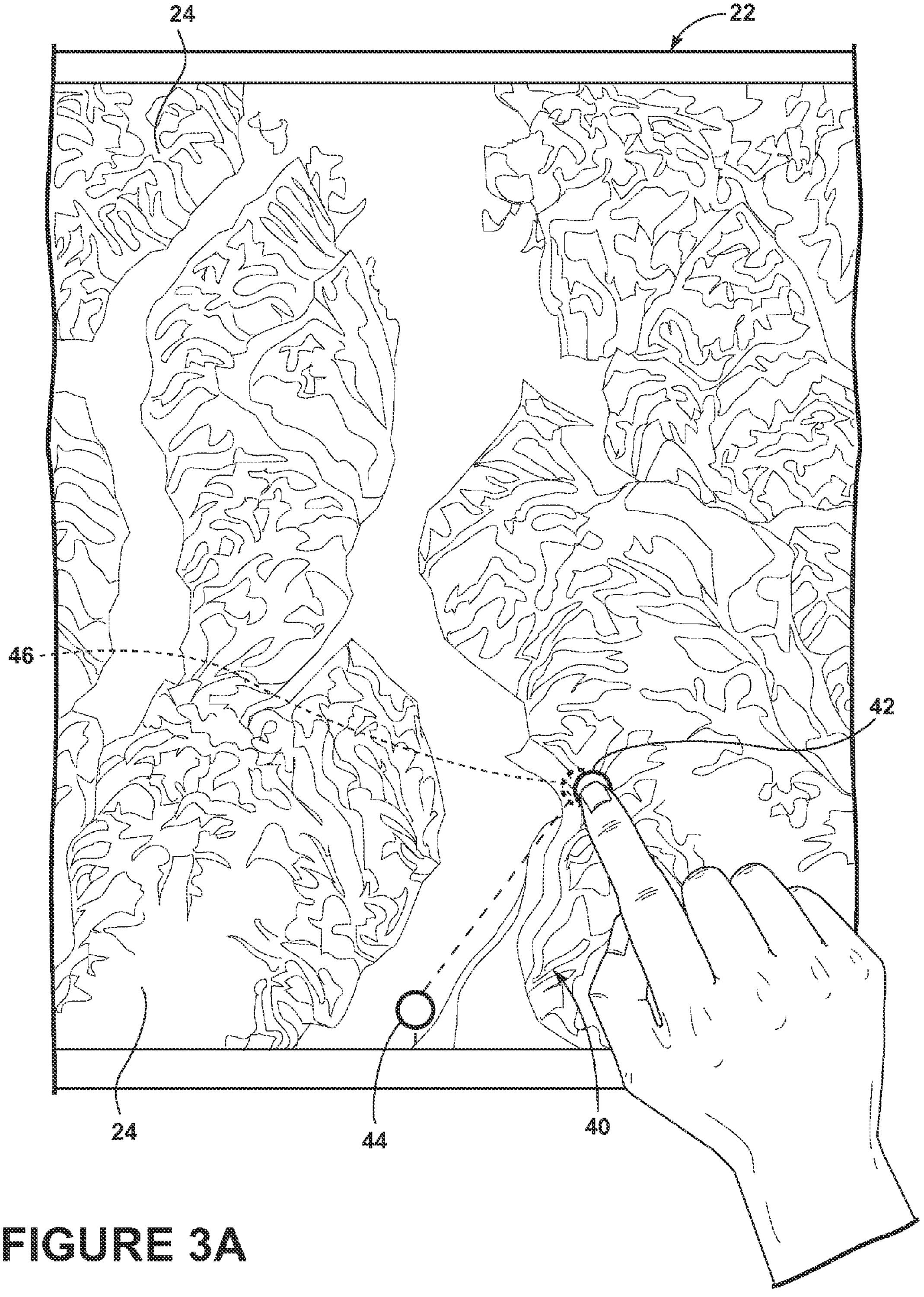
FIGS. 3A-3C are schematic views of a user-inputted waypoint and an alternative waypoint being displayed according to a second embodiment of the invention.
Figure 3B:
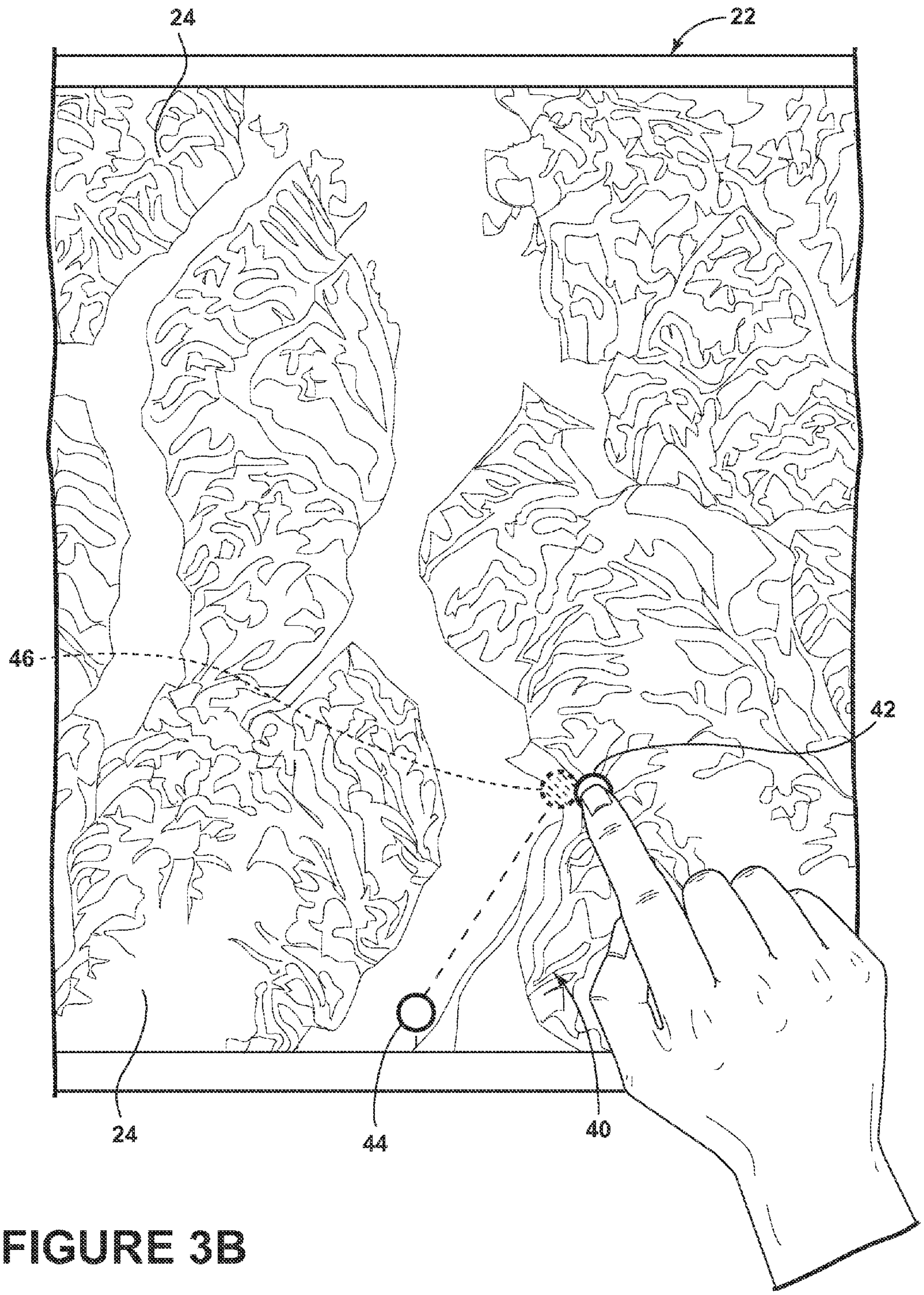
Figure 3C:
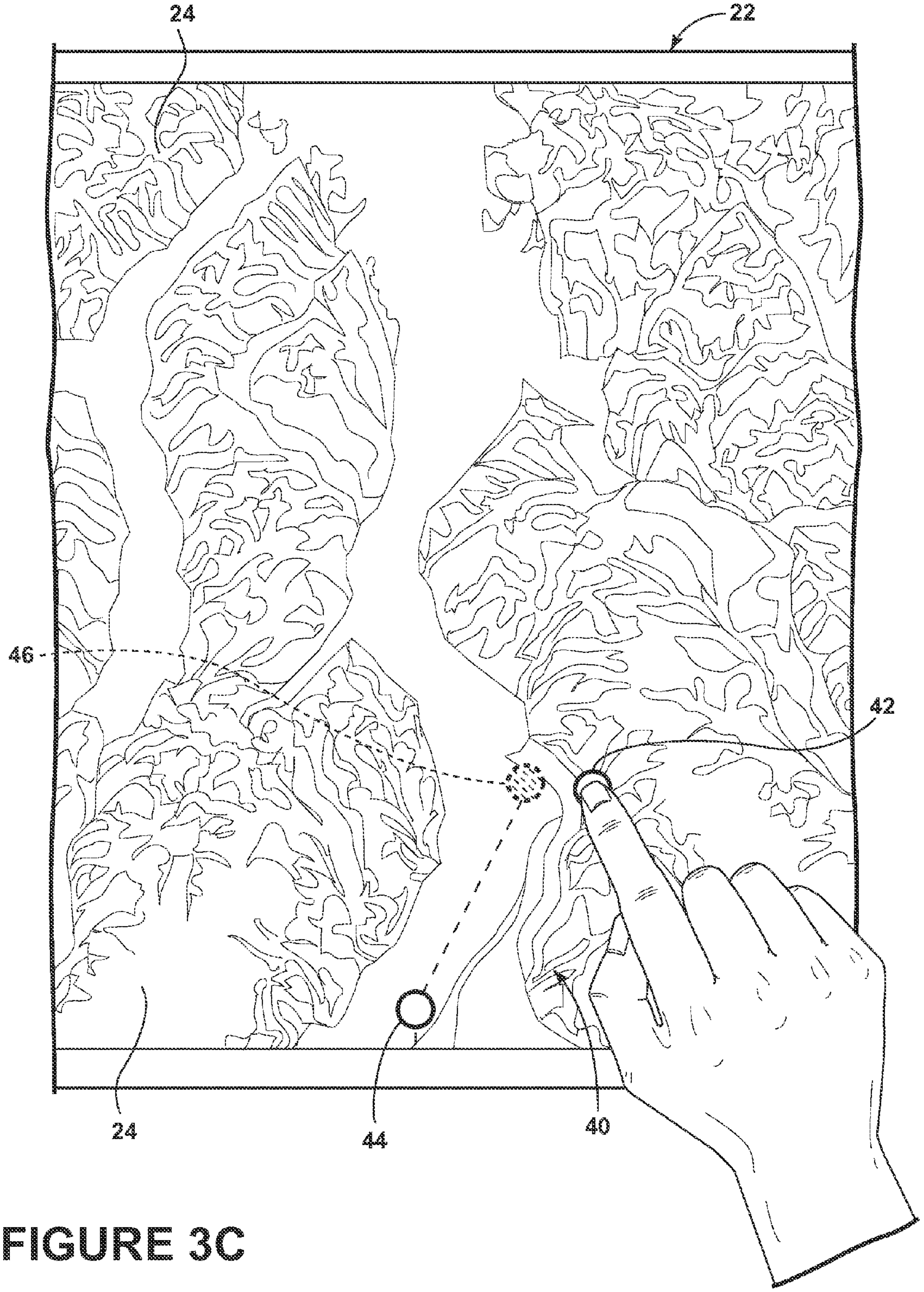

By way of further non-limiting example, the alternative waypoint 46 may be displayed as emerging out of the user-inputted waypoint 42. The emergence of the alternative waypoint out of the user-inputted waypoint 42 is illustrated in FIGS. 3A-3C. FIG. 3A illustrates the alternative waypoint 46 beginning to emerge out of the user-inputted waypoint 42. FIG. 3B illustrates the further emergence of the alternative waypoint 46 out of the user-inputted waypoint 42. Once the alternative waypoint 46 has fully emerged out of the user-inputted waypoint 42 it may move to the final location of the alternative waypoint 46. As illustrated in FIG. 3C, the emerged alternative waypoint 46 may then move to its final location on the flight display 22 including that the alternative waypoint 46 may slide across the flight display 22 to its final location. Further, the alternative waypoint 46 may be displayed as a blinking waypoint. It will be understood that any of these techniques for distinguishing the alternative waypoint 46 may be used in combination with each other.

It is contemplated that once the alternative waypoint 46 is displayed, the user may select the alternative waypoint 46 for its inclusion in the flight plan. The selection of the alternative waypoint 46 may be received by the controller 30. Once the controller 30 has received such a user selection the user-inputted waypoint 42 may be removed from the flight display 22 and the alternative waypoint 46 may be displayed as being undistinguishable from the remainder of the flight plan and any other waypoints displayed on the flight display 22. Further, the alternative waypoint 46 may be considered by the controller 30 to be included within the flight plan.

It is contemplated that if the alternative waypoint 46 is not selected by the user, the controller 30 may modify a previous waypoint on the flight display 22 or a future waypoint on the flight display 22 to accommodate the user-inputted waypoint 42. It is contemplated that the modified previous waypoint of the modified future waypoint may be a user-inputted waypoint or a waypoint from the FMS or airline operations center. For understandable reasons, the previous waypoint may not be modified if the previous waypoint is the current location of the aircraft 10. Such a modification of the prior portions of the flight plan may allow the user-inputted waypoint 42 to become suitable such that an alternative waypoint is not necessary. Furthermore, if the alternative waypoint 46 is not selected by the user, the controller 30 may create at least one other alternative waypoint 46 for the user to choose.

Figure 4:
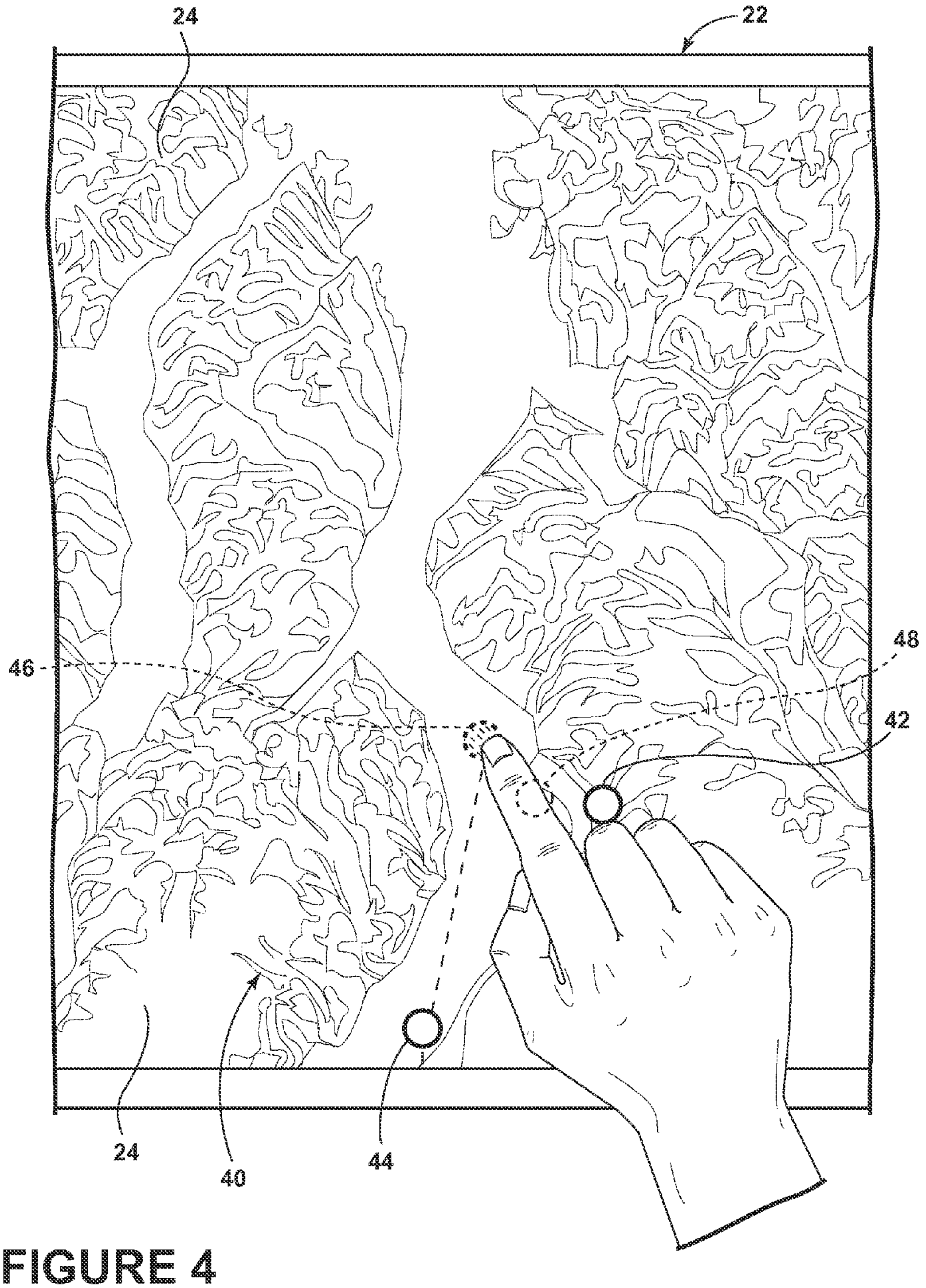
FIG. 4 is a schematic view of a user-inputted waypoint and an alternative waypoint being moved by a user according to a third embodiment of the invention.

Furthermore, as illustrated in FIG. 4, the user may be able to move the alternative waypoint 46 on the flight display 22. When the user moves the alternative waypoint 46 the initial location 48 may be illustrated on the flight display 22. Alternatively, the flight display 22 may not illustrate the initial location of the alternative waypoint 46. The controller 30 may not allow the user to move the alternative waypoint 46 into other unsuitable locations. For example, the user may be blocked from moving the alternative waypoint 46 to an unsuitable location. If a user attempts to move the alternative waypoint 46 into an unsuitable location, they may be alerted and the alternative waypoint may be returned to its initial location 48. Alternatively, the user may move the alternative waypoint 46 to an unsuitable location and upon its placement in the unsuitable location the controller 30 may move the alternative waypoint to a suitable location.

Where the alternative waypoint is moved to a suitable location, receiving the user selection of the alternative waypoint 46 may include receiving movement of the alternative waypoint 46. Alternatively, the controller 30 may receive the movement of the alternative waypoint 46 and may alter the flight display 22 based thereon. The controller 30 may then require the user to confirm the selection of the moved alternative waypoint 46. As with the earlier described example, if the user moves the alternative waypoint 46, a previous waypoint may be modified on the flight display 22 to ensure that no disconnect is formed in the flight plan. Further, if the user moves the alternative waypoint 46, a future waypoint may be modified on the flight display 22 to ensure that no disconnect is formed in the flight plan. Such modifications of the waypoints on the flight display may be done automatically by the controller 30. Portions of the flight plan that have been modified may be displayed in a visually distinguishable manner from other portions of the flight plan. If such modification occurs, the controller 30 may again require that the user confirm the selection of the modified flight plan.

The above described embodiments provide a variety of benefits including that the displayed information may provide the pilot foresight into what waypoints are suitable for inclusion in the flight plan and warns the pilot when an inputted waypoint will not meet flight constraints. There exists the possibility of the user selecting a waypoint that will prevent the aircraft being flown from reaching the next waypoint in the flight plan within safe flight constraints of the aircraft this may result in a disconnect or multiple waypoints with no viable connection between them, which must then be resolved by the user. The above embodiments simplify the pilot interface and allow for time savings in that the user does not have to manually account for this data in selecting a flight path. Instead, an alternative waypoint may be provided to account for this information and the alternative waypoint may allow for the user to see when a waypoint entered will not be achievable given flight constraints and allows the user to make changes to the flight plan before realizing these constraints.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of displaying a flight plan comprising at least one waypoint on a display of a flight deck of an aircraft having known flight constraints, the method comprising:

receiving a user input, from a user input capture device, for a user-inputted waypoint;

determining, by a controller, whether the user-inputted waypoint is suitable based on the known flight constraints;

generating, by the controller, suitable alternative waypoint, different from the user-inputted waypoint, when the user-inputted waypoint is determined to be not suitable; and displaying both the user-inputted waypoint and the alternative waypoint on the display.

2. The method of claim 1, further comprising illustrating a visual representation of the terrain underlying the flight plan.

3. The method of claim 1 wherein the receiving the user-inputted waypoint comprises receiving at least one of a selection input from a touchscreen forming the display and a selection input from a mouse operably coupled to the display.

4. The method of claim 1 wherein the receiving the user-inputted waypoint comprises receiving a latitude, longitude, and elevation from the user.

5. The method of claim 1 wherein the generating an alternative waypoint includes determining an alternative waypoint based on at least one of weather, terrain, fixed obstacles, variable obstacles, and performance attributes of the aircraft.

6. The method of claim 5 wherein the determining whether the user-inputted waypoint is suitable based on at least one of weather, terrain, fixed obstacles, variable obstacles, and flight characteristics of the aircraft.

7. The method of claim 1 wherein displaying the alternative waypoint comprises displaying the alternative waypoint in a visually distinguishable manner from the user-inputted waypoint.

8. The method of claim 7 wherein the displaying the alternative waypoint in a distinguishable manner includes displaying the alternative waypoint with at least one of a different color and a different opacity from the user-inputted waypoint.

9. The method of claim 7 wherein the displaying the alternative waypoint comprises emerging the alternative waypoint out of the user-inputted waypoint.

10. The method of claim 9 wherein the displaying the alternative waypoint comprises moving the emerged alternative waypoint to a final location on the display.

11. The method of claim 1, further comprising receiving a user selection of the alternative waypoint.

12. The method of claim 11 wherein when the alternative waypoint is not selected by the user at least one of a previous waypoint and a future waypoint is modified on the display.

13. The method of claim 12 wherein the previous waypoint is a user-inputted waypoint.

14. The method of claim 11 wherein the user can move the alternative waypoint on the display and receiving the user selection of the alternative waypoint comprises receiving movement of the alternative waypoint.

15. The method of claim 14 wherein when the alternative waypoint is moved by the user a previous waypoint is modified on the display.

16. The method of claim 14 wherein the user is blocked from moving the alternative waypoint to an unsuitable location.

17. The method of claim 1, further comprising determining multiple alternative waypoints and displaying the multiple alternative waypoints.

* * * * *

UNITED STATES PATENT AND TRADEMARK OFFICE

CERTIFICATE OF CORRECTION

PATENT NO. : 8,965,600 B2
APPLICATION NO. : 13/558594
DATED : February 24, 2015
INVENTOR(S) : Kolbe et al.

It is certified that error appears in the above-identified patent and that said Letters Patent is hereby corrected as shown below:

Claims

In Column 6, Line 58, in Claim 1, delete “suitable” and insert -- a suitable --, therefor.

Signed and Sealed this
Twenty-seventh Day of October, 2015

Michelle K. Lee
*Director of the United States Patent and Trademark Office*